United States Patent [19]
Kondo et al.

[11] Patent Number: 4,634,634
[45] Date of Patent: Jan. 6, 1987

[54] GLAZE CERAMIC BASE

[75] Inventors: Kazuo Kondo; Masahiko Okuyama, both of Aichi, Japan

[73] Assignee: NGK Spark Plug Co., Ltd., Aichi, Japan

[21] Appl. No.: 814,177

[22] Filed: Dec. 24, 1985

Related U.S. Application Data

[63] Continuation of Ser. No. 435,204, Oct. 19, 1982, abandoned.

[30] Foreign Application Priority Data

Oct. 19, 1981 [JP] Japan ................................ 56-166780
Jul. 6, 1982 [JP] Japan ................................ 57-117115

[51] Int. Cl.[4] .......................... C03C 3/22; C03C 5/02; C04B 33/26

[52] U.S. Cl. .................................... 428/432; 428/428; 428/701; 428/702; 428/901

[58] Field of Search ............... 428/701, 336, 432, 428, 428/901, 702, 209, 210, 698

[56] References Cited

U.S. PATENT DOCUMENTS 3,927,238 12/1975 Di Marcello ....................... 428/336
4,084,976 4/1978 Hinton ................................ 428/432
4,120,733 10/1978 Knapp .................................. 501/67
4,256,497 3/1981 Knapp .................................. 501/67
4,282,035 8/1981 Nigrin .................................. 501/32
4,340,645 7/1982 O'Conor ............................ 428/432
4,358,541 11/1982 Andrus et al. ........................ 501/65
4,385,127 5/1983 Chyung ................................ 501/65

FOREIGN PATENT DOCUMENTS 5425381 5/1981 Japan .

*Primary Examiner*—Nancy A. B. Swisher
*Attorney, Agent, or Firm*—Sughrue, Mion, Zinn, Macpeak & Seas

[57] ABSTRACT

A glazed ceramic base is disclosed comprising a ceramic base having provided and calcined thereon a glaze composition comprising from 56 to 71 mol % $SiO_2$, 15.5 to 28 mol % BaO, and 6 to 16 mol % $Al_2O_3$ as necessary ingredients, and one or more members of up to 10 mol % SrO, up to 8 mol % $B_2O_3$, up to 10 mol % CaO, and up to 3 mol % MgO as a first group of auxiliary ingredients, with the combined content of the first group of auxiliary ingredients being not more than 10 mol % of the total content. This glaze composition may comprise a second group of auxiliary ingredients.

12 Claims, No Drawings

GLAZE CERAMIC BASE

This is a continuation of application Ser. No. 435,204, filed Oct. 19, 1982 now abandoned.

FIELD OF THE INVENTION

This invention relates to a glaze composition and glazed base, and particularly to a thin glazed base for electronic components, having good flatness of the glazed surface, good heat resistance and good corrosion resistance to $HF+HNO_3$ and showing low thermal conductivity in spite of the absence of PbO and alkali.

BACKGROUND OF THE INVENTION

With the remarkable recent development of the electronics industry, various electronic components have been made more and more sophisticated and precise.

For instance, a glazed ceramic base can be prepared by forming a glass layer on an alumina or beryllia base, and can be used for resistor elements, integrated circuits utilizing highly precise circuits, thermal heads of heat-sensitive recording apparatuses, etc.

With respect to the use of the glazed base as a thermal head, there is a thick film system and a thin film system. The thick film system enables the wiring of 6 dots/mm or more, and the electric potential to be applied can be reduced to ½ that which would otherwise be required by inserting a heat regenerative glass layer; thus the thermal efficiency is improved. The thin film system enables the wiring of 8 dots/mm or more. Therefore, it would be very desirable to obtain an alkali-free and PbO-free glaze having good flatness of the glaze surface, good heat resistance and good corrosion resistance to $HF+HNO_3$.

Alkali and PbO are extremely efficient for improving good flatness. However, in case that the alkali-containing glazed base is used as the thermal heads, alkali is gradually diffused toward a portion where the electric potential decreases due to an applied voltage to make a protuberance on the surface thereof and in a short time the surface is destroyed. On the other hand, in case that the PbO-containing glazed base is used as the thermal heads, a $Pb^{2+}$ ion is reduced to a $Pb^0$ metal to decrease an electric insulation of the glazed base while in a step for fusing together a wiring pattern on the surface, the glazed base is exposed with a reducing atmosphere (when a base metal such as Cu, or etc., which is available in a low price is used as the wiring pattern, the reducing atmosphere is usually selected in order to prevent oxidation thereof).

Further, it is very desirable for the glaze to have a low thermal conductivity, for example, a value of K=0.002 Cal/cm.sec.°C. A thermal conductivity of such a low value enables the use of a thin glaze layer, and hence protuberances and projections of the glaze are reduced so much that a flat-surface glazed ceramic base can be formed.

SUMMARY OF THE INVENTION

The present invention is directed to a high temperature glaze composition having the required qualities as mentioned above and a yield point of 700° C. or higher, and has been accomplished in a glazed ceramic base prepared by coating on a ceramic base and calcining a glaze composition comprising from 56 to 71 mol% $SiO_2$, 15.5 to 28 mol% BaO, and 6 to 16 mol% $Al_2O_3$ as necessary ingredients and up to 10 mol% SrO, up to 8 mol% $B_2O_3$, up to 10 mol% CaO, and up to 3 mol% MgO as a first group of auxiliary ingredients, with the combined content of the first group of auxiliary ingredients being not more than 10 mol% of the total content.

According to a preferred embodiment of the invention, having especially good resistance to HF and $HNO_3$ (to which the glazed surface may be exposed during wiring), there is provided a glaze composition comprising from 56 to 71 mol% $SiO_2$, 15.5 to 28 mol% BaO, and 6 to 16 mol% $Al_2O_3$ as necessary ingredients, and one or more selected from up to 10 mol% SrO, up to 8 mol% $B_2O_3$, up to 10 mol% CaO, and up to 3 mol% MgO as auxiliary ingredients, so that the content of the above described necessary ingredients consisting of $SiO_2$, BaO, and $Al_2O_3$ is from 83 to 99.8 mol% of the total content, and the content of the auxiliary ingredients selected from SrO, $B_2O_3$, CaO, and MgO is from 0.1 to 10 mol% of the total content as the first group of auxiliary ingredients, and one or more ingredients selected from up to 4 mol% $Y_2O_3$, up to 4 mol% $La_2O_3$, up to 6 mol% ZnO, up to 6 mol% $TiO_2$, and up to 3 mol% $ZrO_2$ as a second group of auxiliary ingredients, in an amount of from 0.1 to 7 mol% of the total content, with the total content of the necessary ingredients and the first and second groups of auxiliary ingredients being 100 mol%.

DETAILED DESCRIPTION OF THE INVENTION

The ceramic base according to the present invention is preferably an alumina, beryllia, steatite ceramics or forsterite ceramics base and is more preferably an alumina or beryllia base.

The glaze composition of the present invention has the characteristic aspects that BaO is incorporated in a relatively large quantity in order to obtain a low thermal conductivity, and that $Al_2O_3$ is incorporated within the range described above in order to prevent crystallization and improve heat resistance.

In comparing a glaze composition containing only the necessary ingredients with a glaze composition containing the necessary ingredients and the auxiliary ingredients, the former is somewhat liable to result air bubbles in the glass and devitrify, though other properties are almost the same.

With the above-mentioned glaze composition, if the $SiO_2$ content is less than 56 mol%, there results such a high coefficient of expansion that adhesion to the ceramic base is reduced, whereas if the $SiO_2$ content is more than 71 mol%, the melting properties are undesirably decreased. If the BaO content is less than 15.5 mol%, a sufficiently low thermal conductivity can not be obtained, whereas if the BaO content is more than 28 mol% good flatness of the glaze surface is difficult to attain and the thermal expansion coefficient is undesirably increased. If the $Al_2O_3$ content is less than 6 mol%, heat-stable glass is difficult to obtain, whereas if the $Al_2O_3$ content is more than 16 mol%, melting of the composition becomes difficult.

With respect to the first group of auxiliary ingredients, $B_2O_3$ accelerates vitrification when incorporated up to 8 mol%, but tends to deteriorate heat resistance when incorporated in a higher content; SrO and CaO accelerate vitrification when incorporated in individual or combined amounts up to 10 mol%, but devitrification is liable to take place when they are incorporated in higher contents; MgO accelerates clarification of the glass and aids in the removal bubbles when incorporated in an amount up to 3 mol%. According to a preferred embodiment of the invention, two or more members of the first group of auxiliary ingredients are included, to improve devitrification resistance.

According to a further preferred embodiment, one or more of $Y_2O_3$, $La_2O_3$, ZnO, $TiO_2$ and $ZrO_2$ are added as second auxiliary ingredients and show the beneficial effects of increasing corrosion resistance to $HF+HNO_3$, improving heat resistance, and increasing hardness, when by incorporated in small amounts. Accordingly, any one of them may be used, similarly to the case of the first group of auxiliary ingredients. However, if the $Y_2O_3$ and $La_2O_3$ contents exceed 4%, devitrification is liable to take place. If the ZnO content exceeds 6%, corrosion resistance to $HF+HNO_3$ deteriorates. If the $TiO_2$ content exceeds 6%, devitrification is liable to take place and heat resistance deteriorates. If the $ZrO_2$ content exceeds 3%, air bubbles may remain and a flat surface cannot be obtained. Accordingly, the contents of the second auxiliary ingredients are limited to the above described ranges. In case of using two or more of them, the upper limit is 7%.

The invention will now be described in more detail by the following non-limiting examples of preferred embodiments of the present invention.

EXAMPLES 1-12

$SiO_2$, $Al(OH)_3$, $BaCO_3$, $H_2BO_3$, $CaCO_3$, $SrCO_3$, and $MgCO_3$ were weighed so as to provide glasses of the mol% formulations shown in Table 1, mixed in a grinder, and melted in an alumina crucible at an optimal temperature of 1,450° C. Each molten mixture was quenched by dropping it into water, and was then finely pulverized in an alumina ball mill to obtain glass frit.

Separately, 50×50×1.0 mm alumina bases containing 97% alumina were prepared. 100 parts of the glass frit of each formulation shown in Table 1 was mixed together with 4 parts of ethyl cellulose, 40 parts of butylcarbitol and 40 parts of acetone in an alumina pot-mill and then acetone was evaporated from the mixture to obtain a paste. The resulting paste was applied to the base, dried, and calcined under condition where temperature was increased at a rate of 200° C./h, kept at 1,200° C. to 1,280° C. for two hours and then colded to the room temperature as cooling of the furnace to prepare glazed bases having a glaze thickness of 60±20 μm.

TABLE 1

| Example | Ingredient | | | | | | | | | | |
|---|---|---|---|---|---|---|---|---|---|---|---|
| No. | $SiO_2$ | BaO | $Al_2O_3$ | $B_2O_3$ | CaO | SrO | MgO | PbO | $Na_2O$ | $K_2O$ | Note |
| 1 | 63.1 | 27.9 | 9.0 | — | — | — | — | — | — | — | Within the scope of the invention |
| 2 | 66.0 | 22.9 | 11.1 | — | — | — | — | — | — | — | " |
| 3 | 69.5 | 20.7 | 9.8 | — | — | — | — | — | — | — | " |
| 4 | 51.5 | 38.6 | 9.9 | — | — | — | — | — | — | — | Outside the scope of the invention |
| 5 | 76.9 | 14.3 | 8.8 | — | — | — | — | — | — | — | " |
| 6 | 58.9 | 23.1 | 11.0 | 5.0 | — | — | 2.0 | — | — | — | Within the scope of the invention |
| 7 | 62.4 | 20.2 | 8.2 | 3.6 | 2.2 | 2.4 | 1.0 | — | — | — | " |
| 8 | 64.4 | 15.8 | 13.4 | — | 2.9 | 1.5 | 2.0 | — | — | — | " |
| 9 | 68.0 | 18.1 | 6.1 | 7.8 | — | — | — | — | — | — | " |
| 10 | 62.2 | 15.7 | 6.2 | — | 12.8 | — | 3.1 | — | — | — | Outside the scope of the invention |
| 11 | 59.0 | 16.0 | 7.1 | 11.7 | 5.2 | — | 1.0 | — | — | — | " |
| 12 | $ZnO-B_2O_3-SiO_2$ series (inclusive of $Na_2O$) | | | | | | | | | | Conventional product* |

*Overcoat-use glass, GA-4 manufactured by Nippon Denki Garasu Co., Ltd.

Then the thermal expansion coefficient, thermal conductivity, and surface resistance of each glazed base prepared above were measured to obtain the results set forth in Table 2.

The thermal expansion coefficient was measured by preparing a cylindrically glazed sample having a diameter of 4 to 5 mm and a length of 15 to 20 mm for the glaze of each formulation, and the peak of the expansion curve is set forth in Table 2 as the yield point.

The surface insulation resistance was measured as follows: Two silver electrodes were provided in the glaze surface of each formulation, an electric potential of 100 V was applied across the electrodes using an electrometer, and, after 30 seconds, the leak current across the electrodes was measured. Surface insulation resistance was thus determined from the leak current.

TABLE 2

| | Properties | | | | |
|---|---|---|---|---|---|
| Example No. | Yield Point (°C.) | Thermal Expansion Coefficient (30-400° C.) | Thermal Conductivity $(Cal \cdot cm^{-1} \cdot deg^{-1} \cdot sec^{-1})$ | Surface Resistance 200° C. (Ω/□) | Note |
| 1 | 760 | $7.3 \times 10^{-6}$ | $1.6 \times 10^{-3}$ | $1 \times 10^{14}$ | Within the scope of the invention |
| 2 | 770 | $6.5 \times 10^{-6}$ | $1.7 \times 10^{-3}$ | $1 \times 10^{14}$ | Within the scope of the invention |
| 3 | 740 | $6.1 \times 10^{-6}$ | $1.8 \times 10^{-3}$ | $1 \times 10^{14}$ | Within the scope of the invention |
| 4 | 800 | $8.7 \times 10^{-6}$ | $1.5 \times 10^{-3}$ | $1 \times 10^{14}$ | Outside the scope of the invention |
| 5 | 740 | $4.9 \times 10^{-6}$ | $2.7 \times 10^{-3}$ | $1 \times 10^{14}$ | Outside the scope of the invention |
| 6 | 740 | $6.4 \times 10^{-6}$ | $1.5 \times 10^{-3}$ | $2 \times 10^{14}$ | Within the scope of the invention |
| 7 | 750 | $6.7 \times 10^{-6}$ | $1.7 \times 10^{-3}$ | $3 \times 10^{14}$ | Within the scope of the invention |
| 8 | 780 | $6.2 \times 10^{-6}$ | $1.9 \times 10^{-3}$ | $4 \times 10^{14}$ | Within the scope of the invention |
| 9 | 740 | $5.1 \times 10^{-6}$ | $2.0 \times 10^{-3}$ | $1 \times 10^{14}$ | Within the scope of the invention |
| 10 | Devitrification occurred upon heating | | | | Outside the scope of |

TABLE 2-continued

| Example No. | Properties: Yield Point (°C.) | Thermal Expansion Coefficient (30-400° C.) | Thermal Conductivity ($Cal \cdot cm^{-1} \cdot deg^{-1} \cdot sec^{-1}$) | Surface Resistance 200° C. (Ω/□) | Note |
|---|---|---|---|---|---|
| | | | | | the invention |
| 11 | 670 | $6.1 \times 10^{-6}$ | $2.2 \times 10^{-3}$ | $1 \times 10^{14}$ | Outside the scope of the invention |
| 12 | 510 | $6.2 \times 10^{-6}$ | $3.1 \times 10^{-3}$ | $2 \times 10^{12}$ | Conventional product |

The thermal expansion coefficient of the glaze of the present invention was 5.1 to $7.3 \times 10^{-6}$, which was not so much different from that of the conventional product. With respect to the heat resistance, however, the glaze of the present invention had a yield point of 740° to 780° C., which was 80° to 120° C. higher than that of the conventional product, viz., 660° C.

The glaze of the present invention had a thernal conductivity of 1.5 to $2.0 \times 10^{-3}$, which was remarkably improved as compared with that of the conventional product, $3.3 \times 10^{-3}$, in spite of the absence of alkali metal and PbO, and realized the intended level of K=0.002 Cal/cm.sec.°C. or less.

The glaze surface had a surface resistance of 1 to $4 \times 10^{14}$, thus showing better insulating properties than the conventional product having a surface resistance of $2 \times 10^{12}$, and was, therefore, electrically quite stable.

Examples 13 to 38 and the Reference Example below relate to the preferred embodiment of the invention wherein one or more members of the second group of auxiliary ingredients are included.

EXAMPLES 13-38 AND REFERENCE EXAMPLE $SiO_2$, $Al(OH)_3$, $BaCO_3$, $H_3BO_3$, $CaCO_3$, $SrCO_3$, $MgCO_3$, $Y_2O_3$, $La_2O_3$, ZnO, $TiO_2$ and $ZrO_2$ were weighed so as to provide glasses of the mol% formulations shown in Table 3, mixed in a grinder by a conventional method, and melted in an alumina crucible at an optimal temperature. After the molten mixtures were quenched by dropping each of them into water, the mixtures were finely pulverized in an alumina ball mill to obtain glass frits. The frits were kneaded with an organic binder to obtain pasty frits.

Each paste frit was applied to an alumina base and calcined to prepare a glazed base. The results of measuring various properties of the resulting glazed bases and others are shown in Table 3 below.

(1) Corrosion resistance to $HF+HNO_3$

To a 50 mm×50 mm×1 mm alumina porcelain base having an alumina content of 97%, the above described pasty frit was applied by screen printing. After drying, it was calcined at a glazing temperature as shown in Table 1 to prepare a glazed base having a glaze having a thickness 50±10 μm. After it was dipped in a solution of $HF:HNO_3$ (1:1 volume ratio) for 15 seconds, the corrosion thickness of the glazed surface was measured by a surface roughness meter.

(2) Yield Point

A cylindrically glazed sample having a diameter of 4 to 5 mm and a length of 15 to 20 mm was produced at the same glazing temperature as in (1). The thermal expansion coefficient thereof was measured, and the peak of the expansion curve was determined.

(3) Vickers Hardness

The Vickers hardness was measured under a weight of 200 g using the same glazed base as in (1).

(4) Thermal Conductivity

A disk-like glazed sample having a diameter of 9 mm and a thickness of 1 mm was produced in the same manner as in (2), and the thermal conductivity was measured using a thermal constant measuring apparatus TLP-1000 type manufactured by SANKI ENG. CO., LTD. by a laser flash method. The laser flash method is a kind of laser pulse method, and described, for example, in Susumu Naniwa et al., Laser-pulse-ho niyoru netsujosu no sokutei, Oyobuturi, Vol. 36, No. 8, pp. 661 to 665 (1967), and Yoichi Takahashi et al., Ceramic zairyo no netsubussei no sokutei, Ceramic, Vol. 11, No. 5, pp. 399 to 407 (1976) in detail.

TABLE 3

| Example | Ingredients (mol %): Necessary Ingredients | | | | First Group of Ingredients | | | | | Second Group of Ingredients | | | | | |
|---|---|---|---|---|---|---|---|---|---|---|---|---|---|---|---|
| No. | $SiO_2$ | BaO | $Al_2O_3$ | Total | $B_2O_3$ | CaO | SrO | MgO | Total | $Y_2O_3$ | $La_2O_3$ | ZnO | $TiO_2$ | ZrO | Total |
| 13 | 60 | 20 | 10 | 90 | 1 | 2 | 2 | 1 | 6 | 0.5 | 0.5 | 1 | 1.5 | 0.5 | 4 |
| 14 | " | " | " | " | " | " | " | " | " | 4 | — | — | — | — | " |
| 15 | " | " | " | " | — | 6 | — | — | " | — | 4 | — | — | — | " |
| 16 | " | " | " | " | — | — | 6 | — | " | — | — | 4 | — | — | " |
| 17 | " | " | " | " | 3 | — | — | 3 | " | — | — | — | 4 | — | " |
| 18 | " | " | " | " | — | 3 | 3 | — | " | 1 | — | — | — | 3 | " |
| 19 | 71 | 15.5 | 6 | 92.5 | 1 | 1.5 | 1 | 1 | 4.5 | 1.4 | 0.5 | 0.5 | 0.5 | 0.1 | 3 |
| 20 | 56 | 28 | 6 | 90 | 2 | 2 | 2 | 1 | 7 | 0.5 | 0.5 | 0.5 | 1 | 0.5 | 3 |
| 21 | 56 | 15.5 | 16 | 87.5 | 2 | 2 | 1.5 | 1 | 6.5 | 1 | 1 | 1.5 | 1.5 | 1 | 6 |
| 22 | 58 | 17.5 | 7.5 | 83 | 2 | 3 | 4 | 1 | 10 | 1.5 | 1.5 | 1.5 | 1.5 | 1 | 7 |
| 23 | " | " | " | " | " | " | " | " | " | 4 | — | 3 | — | — | " |
| 24 | " | " | " | " | " | " | " | " | " | — | 4 | — | 3 | — | " |
| 25 | " | " | " | " | " | " | " | " | " | — | — | 6 | 1 | — | " |
| 26 | " | " | " | " | " | " | " | " | " | — | — | 1 | 6 | — | " |
| 27 | " | " | " | " | " | " | " | " | " | 4 | — | — | — | 3 | " |
| 28 | 63.9 | 22 | 13.9 | 99.8 | 0.1 | — | — | — | 0.1 | 0.1 | — | — | — | — | 0.1 |
| 29 | " | " | " | " | — | 0.1 | — | — | " | — | 0.1 | — | — | — | " |
| 30 | " | " | " | " | — | — | 0.1 | — | " | — | — | 0.1 | — | — | " |
| 31 | " | " | " | " | — | — | — | 0.1 | " | — | — | — | 0.1 | — | " |

TABLE 3-continued

| | | | | | | | | | | | | | | | |
|---|---|---|---|---|---|---|---|---|---|---|---|---|---|---|---|
| 32 | " | " | " | " | 0.05 | — | — | 0.05 | " | — | — | — | — | 0.1 | " |
| 33 | 66 | 23 | 11 | 100 | — | — | — | — | 0 | — | — | — | — | — | 0 |
| 34 | 57 | 16.5 | 6.5 | 80 | 2 | 3 | 4 | 1 | 10 | 2 | 2 | 2 | 2 | 2 | 10 |
| 35 | 61 | 21 | 11 | 93 | 2 | 2 | 2 | 1 | 7 | — | — | — | — | — | 0 |
| 36 | 63 | 23 | 11 | 97 | — | — | — | — | 0 | 1 | 0.5 | 0.5 | 0.5 | 0.5 | 3 |
| 37 | 59 | 18 | 8 | 85 | 3 | 3 | 4 | 2 | 12 | 1 | 0.5 | 0.5 | 0.5 | 0.5 | 3 |
| 38 | 59 | 18 | 8 | 85 | 1 | 2 | 1 | 1 | 5 | 2 | 2 | 2 | 2 | 2 | 10 |
| Reference | ZnO—$B_2O_3$—$SiO_2$ Series (inclusive of $Na_2O$) | | | | | | | | | | | | | | |

| | | Properties | | | | | | |
|---|---|---|---|---|---|---|---|---|
| Example No. | Glazing Temperature (°C.) | Corrosion Resistance to HF + $HNO_3$ (μm) | Yield Point (°C.) | Vickers Hardness | Thermal Conductivity (Cal · cm · $deg^{-1}$ · $sec^{-1}$) × $10^{-3}$ | Thermal Expansion Coefficient (30-400° C.) × $10^{-6}$ | Surface Resistance (200° C. Ω/□) × $10^{14}$ | Note |
| 13 | 1,270 | 7 | 800 | 580 | 1.7 | 6.7 | 1 | This invention |
| 14 | " | 7 | 830 | 590 | 1.7 | 6.6 | 1 | " |
| 15 | " | 8 | 820 | 580 | 1.7 | 6.7 | 1 | " |
| 16 | " | 9 | 790 | 540 | 1.7 | 7.0 | 1 | " |
| 17 | 1,250 | 9 | 770 | 540 | 1.7 | 6.2 | 2 | " |
| 18 | 1,270 | 9 | 800 | 570 | 1.7 | 6.9 | 1 | " |
| 19 | " | 7 | 800 | 580 | 1.8 | 5.7 | 1 | " |
| 20 | " | 10 | 790 | 560 | 1.6 | 7.5 | 1 | " |
| 21 | " | 7 | 830 | 580 | 1.7 | 6.6 | 1 | " |
| 22 | " | 8 | 790 | 590 | 1.7 | 6.6 | 1 | " |
| 23 | " | 7 | 800 | 610 | 1.7 | 6.2 | 1 | " |
| 24 | " | 8 | 790 | 590 | 1.7 | 6.6 | 1 | " |
| 25 | " | 9 | 780 | 570 | 1.7 | 6.6 | 1 | " |
| 26 | 1,250 | 9 | 770 | 570 | 1.7 | 6.6 | 1 | " |
| 27 | 1,270 | 8 | 790 | 580 | 1.7 | 6.7 | 1 | " |
| 28 | " | 9 | 780 | 540 | 1.7 | 6.5 | 1 | " |
| 29 | 1,250 | 9 | 760 | 540 | 1.7 | 6.4 | 1 | " |
| 30 | " | 10 | 780 | 540 | 1.7 | 6.6 | 1 | " |
| 31 | " | 10 | 780 | 540 | 1.7 | 6.7 | 1 | " |
| 32 | " | 10 | 780 | 540 | 1.7 | 6.5 | 1 | " |
| 33 | " | 14 | 770 | 520 | 1.7 | 6.5 | 1 | " |
| 34 | — | | | | Devitrification | | | Outside the scope of the invention |
| 35 | 1,230 | 13 | 740 | 520 | 1.7 | 6.7 | 1 | Outside the scope of the invention |
| 36 | — | | | | Devitrification | | | Outside the scope of the invention |
| 37 | 1,230 | 11 | 720 | 500 | 1.8 | 7.9 | 1 | Outside the scope of the invention |
| 38 | — | | | | Devitrification | | | Outside the scope of the invention |
| Reference | 800 | 6 | 510 | 480 | 3.1 | 6.2 | 2 × $10^{12}$ | Conventional products* |

*Overcoat-use glass, GA-4 manufactured by Nippon Denki Garasu Co., Ltd.

As is clear from Table 3, in the glaze compositions of the preferred embodiment of the present invention, which comprise from 56 to 71 mol% $SiO_2$, 15.5 to 28 mol% BaO, and 6 to 16 mol% $Al_2O_3$ as necessary ingredients, with a content of from 83 to 99.8 mol% of the total content, one or more members selected from up to 10 mol% SrO, up to 8 mol% $B_2O_3$, up to 10 mol% CaO, and up to 3 mol% MgO as a first group of auxiliary ingredients with a content of from 0.1 to 10 mol% of the total content, and one or more members selected from up to 4 mol% $Y_2O_3$, up to 4 mol% $La_2O_3$, up to 6 mol% $ZnO_2$, up to 6 mol% $TiO_2$ and up to 3 mol% $ZrO_2$ as a second group of auxiliary ingredients with a content of from 0.1 to 7 mol% of the total content, with the total content of the necessary ingredients and the first and second groups of auxiliary ingredients being 100 mol%, were as follows:

(1) Example Nos. 13-18, wherein the total content of the necessary ingredients and the content of each necessary ingredient were fixed to intermediate values, and the total content of the first and second groups of auxiliary ingredients and the contents of each auxiliary ingredient were fixed so as to be intermediate values.

(2) Example Nos. 19-21, wherein the total content of the necessary ingredients was fixed so as to be an intermediate value, but the contents of individual necessary ingredients were varied so as to approach the upper limit or the lower limit thereof, and the contents of the first and second auxiliary ingredients were increased or decreased from those of Example No. 13.

(3) Example Nos. 22-27, wherein the individual contents of necessary ingredients were near the lower limit and the total contents thereof was also near the lower limit, and the total contents of the first and second groups of auxiliary ingredients were near the upper limits thereof, the contents of the first auxiliary ingredients were increased from those of Example No. 13, and two or more of the second auxiliary ingredients were used.

(4) Example Nos. 28-32, wherein the contents of necessary ingredients were fixed so as to be intermediate values and the total content of them was fixed so as to be the upper limit, and the balance was equally divided with the first and second auxiliary ingredients.

For Examples 13-32 as described above, the corrosion resistance to $HF+HNO_3$ was remarkably improved without having any adverse influence upon other properties.

In contrast, (I) Example No. 33, which did not contain any of the first or second group auxiliary ingredients, and wherein the contents of necessary ingredients were intermediate values, namely, $SiO_2$ 66%, BaO 23% and $Al_2O_3$ 11%; and (II) Example No. 35, which did not contain any of the second group auxiliary ingredients, and wherein the total contents of the necessary ingredients and the first group of auxiliary ingredients and the individual contents thereof were fixed at intermediate values; were not so resistant to corrosion as the preferred embodiments of the invention.

As described above, the preferred embodiments of the present invention show a remarkably excellent effect by incorporating the first group of auxiliary ingredients and the second group of auxiliary ingredients in addition to the necessary ingredients.

On the contrary, Example No. 34, having excess contents of the first and second groups of auxiliary ingredients; Example No. 36, which did not contain any member of the first group of auxiliary ingredients, but rather only member of the necessary ingredients and the second group of auxiliary ingredients (which is the reverse of Example No. 35); and Example No. 38, having excess contents of the secondary group of auxiliary ingredients, although the contents of the first group of auxiliary ingredients were intermediate values, all caused devitrification. Further, Example 37, having excess contents of the first group of auxiliary ingredients, although the contents of the second group of auxiliary ingredients were intermediate values (which is reverse to Example No. 38) did not cause devitrification, and had improved corrosion resistance to $HF+HNO_3$, but other properties thereof were unsatisfactory.

Still further, the prior $ZnO—B_2O_3—SiO_2$ series glass containing alkali, described as the Reference Example, had high corrosion resistance to $HF+HNO_3$, but was unsatisfactory in various properties, including yield point, thermal conductivity, and surface resistance, etc.

As is described hereinbefore, the glazed ceramic base of the present invention has excellent qualities, and is suited for use as glazed base, thin base, printer head base, etc.

While the invention has been described in detail and with reference to specific embodiments thereof, it will be apparent to one skilled in the art that various changes and modifications can be made therein without departing from the spirit and scope thereof.

What is claimed is:

1. A glazed ceramic base comprising a ceramic base having provided and calcined thereon a glaze composition comprising from 56 to 71 mol% $SiO_2$, 15.5 to 28 mol% BaO, and 6 to 16 mol% $Al_2O_3$ as necessary ingredients, and one or more members of up to 10 mol% SrO, up to 8 mol% $B_2O_3$, up to 10 mol% CaO, and up to 3 mol% MgO as a first group of auxiliary ingredients, with the combined content of the first group of auxiliary ingredients being not more than 10 mol% of the total content.

2. A glazed ceramic base as described in claim 1, wherein the ceramic base is an alumina or beryllia base.

3. A glazed ceramic base as in claim 1, wherein the glaze composition comprises 56 to 71 mol% $SiO_2$, 15.5 to 28 mol% BaO and 6 to 16 mol% $Al_2O_3$ as necessary ingredients with a content of from 83 to 99.8 mol% of the total content, one or more members selected from up to 10 mol% SrO, up to 8 mol% $B_2O_3$, up to 10 mol% CaO, and up to 3 mol% MgO as a first group of auxiliary ingredients with a content of from 0.1 to 10 mol% of the total content, and one or more members selected from up to 4 mol% $Y_2O_3$, up to 4 mol% $La_2O_3$, up to 6 mol% $ZrO_2$, up to 6 mol% $TiO_2$, and up to 3 mol% ZnO as a second group of auxiliary ingredients with a content of from 0.1 to 7 mol% of the total content, with the total content of the necessary ingredients and the first and second groups of auxiliary ingredients being 100 mol%.

4. A glazed ceramic base as in claim 3, wherein the ceramic base is an alumina or beryllia base.

5. A glazed ceramic base as claimed in claim 1, wherein the $Al_2O_3$ and BaO are contained in amounts so that the glaze has good flatness, good heat resistance and good corrosion resistance to HF and $HNO_3$, and exhibits low thermal conductivity despite the absence of PbO and alkalis.

6. A glazed ceramic base as claimed in claim 1, wherein the BaO is contained in amounts which provides low thermal conductivity and the $Al_2O_3$ is contained in amounts which prevents crystallization and improves heat resistance.

7. A glaze composition for the surface of a ceramic base comprising from 56 to 71 mol% $SiO_2$, 15.5 to 28 mol% BaO, and 6 to 16 mol% $Al_2O_3$ as necessary ingredients, and one or more members of up to 10 mol% SrO, up to 8 mol% $B_2O_3$, up to 10 mol% CaO, and up to 3 mol% MgO as a first group of auxiliary ingredients, with the combined content of the first group of auxiliary ingredients being not more than 10 mol% of the total content.

8. A glaze composition as in claim 7, wherein the ceramic base is an alumina or beryllia base.

9. A glaze composition as in claim 7, wherein the composition comprises 56 to 71 mol% $SiO_2$, 15.5 to 28 mol% BaO and 6 to 16 mol% $Al_2O_3$ as necessary ingredients with a content of from 83 to 99.8 mol% of the total content, one or more members selected from up to 10 mol% SrO, up to 8 mol% $B_2O_3$, up to 10 mol% CaO, and up to 3 mol% MgO as a first group of auxiliary ingredients with a content of from 0.1 to 10 mol% of the total content, and one or more members selected from up to 4 mol% $Y_2O_3$, up to 4 mol% $La_2O_3$, up to 6 mol% $ZrO_2$, up to 6 mol% $TiO_2$, and up to 3 mol% ZnO as a second group of auxiliary ingredients with a content of from 0.1 to 7 mol% of the total content, with the total content of the necessary ingredients and the first and second groups of auxiliary ingredients being 100 mol%.

10. A glaze composition as in claim 9, wherein the ceramic base is an alumina or beryllia base.

11. A glaze composition as claimed in claim 1, wherein the $Al_2O_3$ and BaO are contained in amounts so that the glaze has good flatness, good heat resistance and good corrosion resistance to HF and $HNO_3$, and has low thermal conductivity despite the absence of PbO and alkalis.

12. A glaze composition as claimed in claim 5, wherein the BaO is contained in an amount which provides low thermal conductivity and the $Al_2O_3$ is contained in an amount which prevents crystallization and improves heat resistance.

* * * * *